(12) United States Patent  
Cho

(10) Patent No.: US 8,975,808 B2  
(45) Date of Patent: Mar. 10, 2015

(54) LIGHT DIFFUSION OF VISIBLE EDGE LINES IN A MULTI-DIMENSIONAL MODULAR DISPLAY

(71) Applicant: Lightizer Korea Inc., Anyang (KR)

(72) Inventor: Byoung gu Cho, Seoul (KR)

(73) Assignee: Lightizer Korea Inc., Anyang (KR)

( * ) Notice: Subject to any disclaimer, the term of this patent is extended or adjusted under 35 U.S.C. 154(b) by 0 days.

(21) Appl. No.: 14/082,684

(22) Filed: Nov. 18, 2013

(65) Prior Publication Data

US 2014/0139097 A1 May 22, 2014

Related U.S. Application Data

(63) Continuation of application No. 12/960,723, filed on Dec. 6, 2010, now Pat. No. 8,587,187.

(51) Int. Cl.
| | |
|---|---|
| *H01J 5/16* | (2006.01) |
| *H01J 61/40* | (2006.01) |
| *H01K 1/26* | (2006.01) |
| *H01K 1/30* | (2006.01) |
| *G09F 13/04* | (2006.01) |
| *H04N 13/04* | (2006.01) |

(52) U.S. Cl.
CPC ............... *G09F 13/04* (2013.01); *H04N 13/04* (2013.01)
USPC .......................................... 313/116; 313/498

(58) Field of Classification Search
USPC ................................................ 313/498–512
See application file for complete search history.

(56) References Cited

U.S. PATENT DOCUMENTS

| | | |
|---|---|---|
| 4,746,981 A | 5/1988 | Nadan et al. |
| 4,800,376 A | 1/1989 | Suga et al. |
| 4,866,530 A | 9/1989 | Kalua |
| 5,361,078 A | 11/1994 | Caine |
| 5,488,385 A | 1/1996 | Singhal et al. |
| 6,028,643 A | 2/2000 | Jordan et al. |

(Continued)

FOREIGN PATENT DOCUMENTS

WO    WO 2005011293 A1 *   2/2005 ............. H04N 13/00

OTHER PUBLICATIONS

9X Media, Inc., http://www.9xmedia.com, Jun. 27, 2010, 3 pages.

(Continued)

*Primary Examiner* — Donald Raleigh
(74) *Attorney, Agent, or Firm* — Maxine L. Barasch; Keohane & D'Alessandro, PLLC

(57) ABSTRACT

Embodiments of the present invention provide light diffusion into edge lines of a modular display, and thus provide a modular display that is capable of displaying a single, continuous image without visible edge lines between individual display modules. One display module includes a multitude of pixels that contain red, green, blue, and white light sources. The replacement of an edge line blocking dam with the light diffusion edge line of the individual display module can provide a single, continuous image to be displayed thereon without visible, image-quality-reducing edge lines. With various heights of the buffer layer, the light can concentrate on the edge line in modular display. The individual display modules can be light emitting diode (LED), organic LED (OLED), UV LED, RGB LED, Phosphor-based LED, Quantum dot LED, or displays based upon a combination thereof. Furthermore, the variable height buffer layer allows for a modular display image in 2-dimensional or 3-dimensional formats.

20 Claims, 7 Drawing Sheets

(56) References Cited

U.S. PATENT DOCUMENTS

| | | | |
|---|---|---|---|
| 6,100,936 | A | 8/2000 | Jordan et al. |
| 6,292,157 | B1 | 9/2001 | Greene et al. |
| 6,650,044 | B1 | 11/2003 | Lowery |
| 7,079,157 | B2 | 7/2006 | Deering |
| 7,190,328 | B1 | 3/2007 | Clar |
| 7,446,733 | B1 | 11/2008 | Hirimai |
| 7,561,116 | B2 | 7/2009 | Westerinen et al. |
| 7,565,616 | B2 | 7/2009 | Buchmann |
| 7,598,528 | B2 | 10/2009 | Oh et al. |
| 7,955,875 | B2 | 6/2011 | Hardin |
| 8,017,417 | B1 | 9/2011 | Cho |
| 8,227,274 | B2 | 7/2012 | Cho |
| 2003/0048275 | A1 | 3/2003 | Ciolac |
| 2003/0181122 | A1 | 9/2003 | Collins et al. |
| 2004/0259635 | A1 | 12/2004 | Germeraad |
| 2005/0212716 | A1 | 9/2005 | Feigel et al. |
| 2005/0225232 | A1 | 10/2005 | Boroson et al. |
| 2006/0114172 | A1 | 6/2006 | Shivji |
| 2006/0232202 | A1* | 10/2006 | Matsuda et al. ............... 313/506 |
| 2006/0282855 | A1 | 12/2006 | Margulis |
| 2007/0070476 | A1 | 3/2007 | Yamada et al. |
| 2007/0120763 | A1 | 5/2007 | Da Paepe et al. |
| 2008/0094510 | A1 | 4/2008 | Lee et al. |
| 2008/0124574 | A1 | 5/2008 | Shoda et al. |
| 2008/0150416 | A1 | 6/2008 | Maruyama et al. |
| 2008/0157103 | A1 | 7/2008 | Chandra |
| 2008/0173884 | A1 | 7/2008 | Chitnis et al. |
| 2008/0179611 | A1 | 7/2008 | Chitnis et al. |
| 2008/0220285 | A1 | 9/2008 | Vestweber et al. |
| 2009/0050907 | A1 | 2/2009 | Yuan et al. |
| 2009/0057690 | A1 | 3/2009 | Chakraborty |
| 2009/0065790 | A1 | 3/2009 | Chitnis et al. |
| 2009/0080185 | A1 | 3/2009 | McMillan |
| 2009/0102744 | A1 | 4/2009 | Ram |
| 2009/0152572 | A1 | 6/2009 | Su et al. |
| 2009/0236506 | A1 | 9/2009 | Dudgeon et al. |
| 2009/0272969 | A1 | 11/2009 | Suh et al. |
| 2009/0283780 | A1 | 11/2009 | Ansems et al. |
| 2010/0060553 | A1 | 3/2010 | Zimmerman et al. |
| 2010/0081218 | A1 | 4/2010 | Hardin |
| 2010/0102335 | A1 | 4/2010 | Takagi et al. |
| 2010/0123384 | A1* | 5/2010 | Miller et al. ................... 313/498 |
| 2010/0123732 | A1 | 5/2010 | Jenks et al. |
| 2010/0155750 | A1 | 6/2010 | Donofrio |
| 2010/0157030 | A1 | 6/2010 | Nayar et al. |
| 2010/0197072 | A1 | 8/2010 | Kim et al. |
| 2011/0006327 | A1 | 1/2011 | Park et al. |
| 2011/0079815 | A1 | 4/2011 | Yamada et al. |

OTHER PUBLICATIONS

Cinemassive, Trio Gemini—Six Screen Multi Monitor Display, http://cinemassivedisplays.com/trio_gemini.php, Jun. 30, 2010, 8 pages.

Donald L. Raleigh, USPTO Office Action, U.S. Appl. No. 12/960,723, Mail Date Aug. 24, 2012, 20 pages.

Donald L. Raleigh, USPTO Final Office Action, U.S. Appl. No. 12/960,723, Notification Date Jan. 28, 2013, 29 pages.

Donald L. Raleigh, USPTO Notice of Allowance and Fee(s) Due, U.S. Appl. No. 12/960,723, Date Mailed Jul. 19, 2013, 19 pages.

Joseph Schoenholtz, USPTO Office Action, U.S. Appl. No. 12/693,632, Mail Date Oct. 27, 2011, 15 pages.

Joseph Schoenholtz, USPTO Notice of Allowance and Fee(s) Due, U.S. Appl. No. 12/693,632, Date Mailed Mar. 23, 2012, 8 pages.

Suberr L. Chi, USPTO Office Action, U.S. Appl. No. 12/750,823, Mail Date Jun. 14, 2012, 18 pages.

Suberr L. Chi, USPTO Final Office Action, U.S. Appl. No. 12/750,823, Notification Date Jan. 15, 2013, 17 pages.

Suberr L. Chi, USPTO Office Action, U.S. Appl. No. 12/750,823, Notification Date May 17, 2013, 16 pages.

Christopher J. Kohlman, USPTO Office Action, U.S. Appl. No. 12/851,575, Mail Date Apr. 12, 2012, 20 pages.

Christopher J. Kohlman, USPTO Final Office Action, U.S. Appl. No. 12/851,575, Mail Date Aug. 14, 2012, 18 pages.

Christopher J. Kohlman, USPTO Office Action, U.S. Appl. No. 12/851,575, Notification Date Feb. 7, 2013, 24 pages.

Christopher J. Kohlman, USPTO Final Office Action, U.S. Appl. No. 12/851,575, Notification Date Jul. 1, 2013, 22 pages.

Scott B. Geyer, USPTO Office Action, U.S. Appl. No. 12/750,816, Mail Date Feb. 3, 2011, 12 pages.

Scott B. Geyer, USPTO Office Action, U.S. Appl. No. 12/750,816, Mail Date Apr. 7, 2011, 6 pages.

Scott B. Geyer, USPTO Notice of Allowance and Fee(s) Due, U.S. Appl. No. 12/750,816, Date Mailed Jul. 21, 2011, 5 pages.

Sitaramarao S. Yechuri, USPTO Office Action, U.S. Appl. No. 12/851,573, Mail Date Jun. 29, 2012, 17 pages.

Sitaramarao S. Yechuri, USPTO Final Office Action, U.S. Appl. No. 12/851,573, Mail Date Nov. 7, 2012, 26 pages.

Sitaramarao S. Yechuri, USPTO Office Action, U.S. Appl. No. 12/851,573, Notification Date Mar. 29, 2013, 45 pages.

Sitaramarao S. Yechuri, USPTO Final Office Action, U.S. Appl. No. 12/851,573, Notification Date Oct. 8, 2013, 26 pages.

* cited by examiner

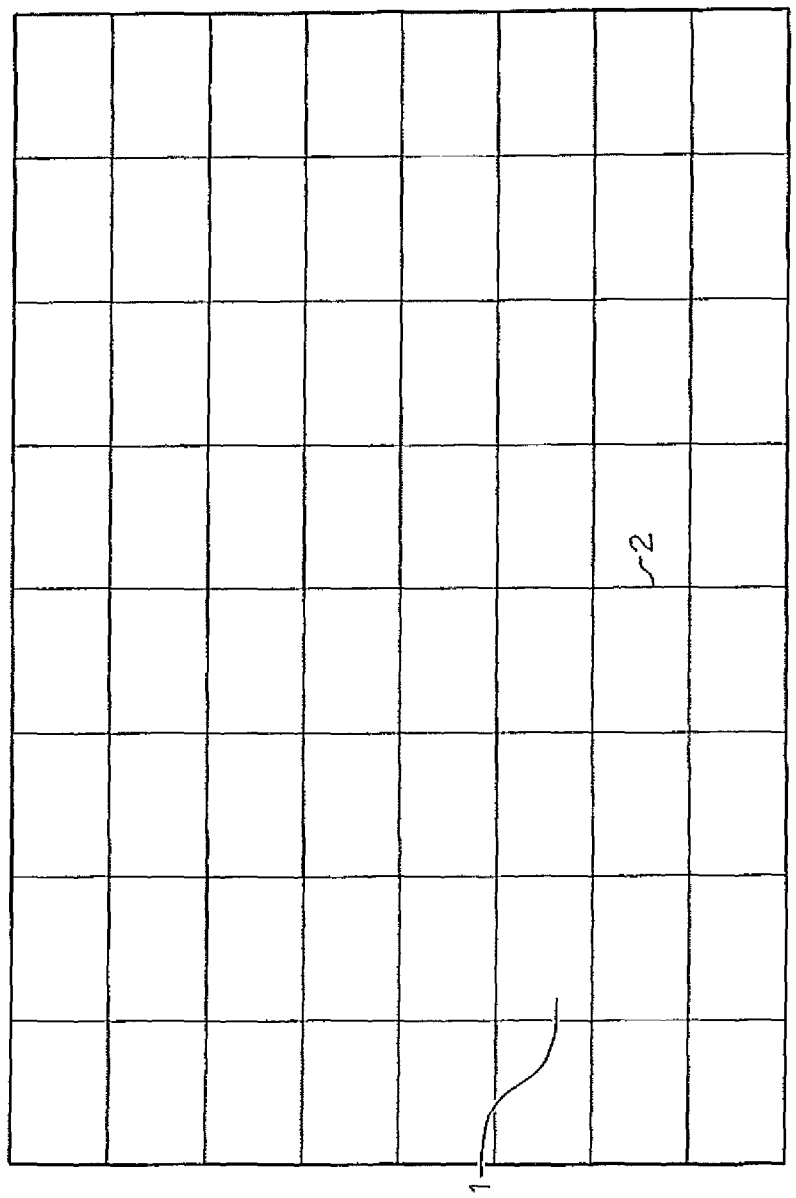

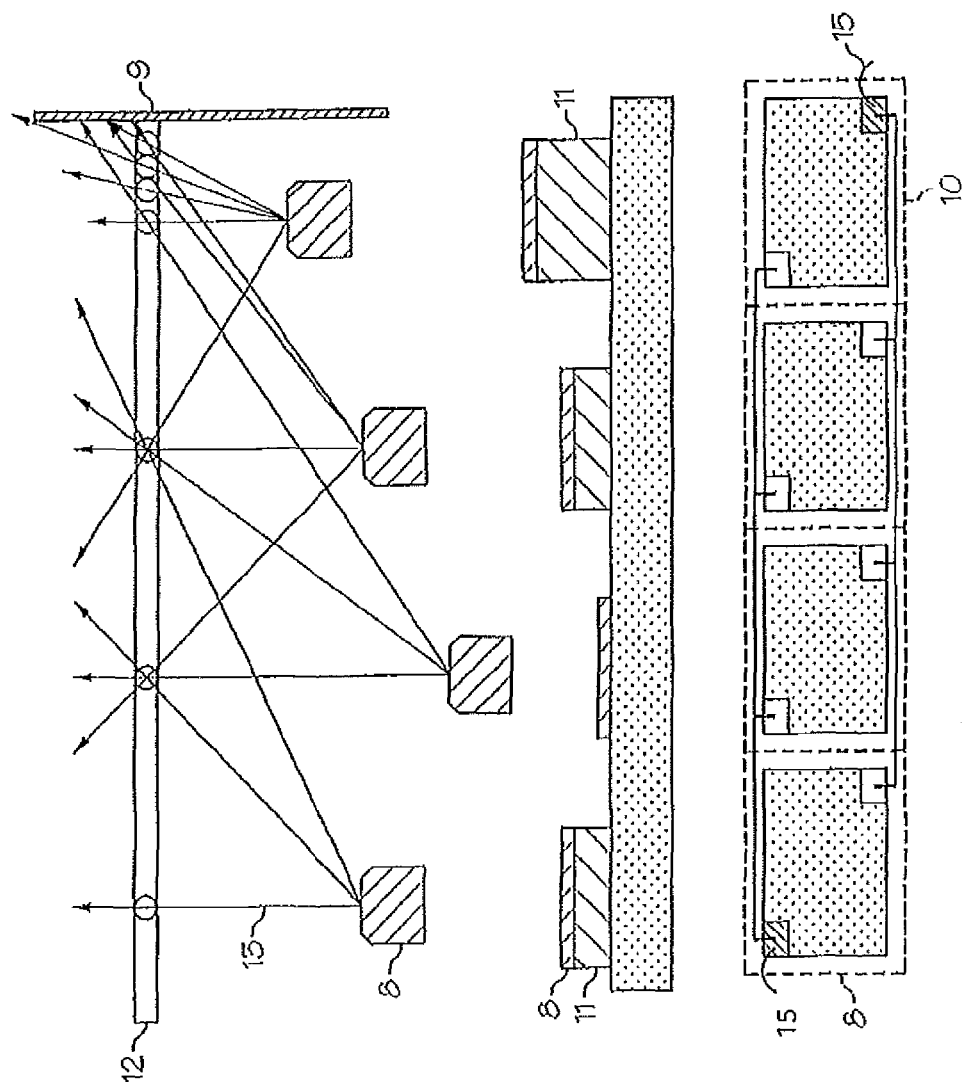

LIGHT DIFFUSION OF VISIBLE EDGE LINES IN A MULTI-DIMENSIONAL MODULAR DISPLAY

CROSS-REFERENCE TO RELATED APPLICATIONS

The present patent document is a continuation of U.S. patent application Ser. No. 12/960,723 filed Dec. 6, 2010, entitled LIGHT DIFFUSION OF VISIBLE EDGE LINES IN A MULTI-DIMENSIONAL MODULAR DISPLAY, the disclosure of which is incorporated herein by reference. The present invention is related in some aspects to commonly-owned and co-pending application Ser. No. 12/693,632, filed Jan. 26, 2010, and entitled LIGHT EMITTING DIODE (LED) AND METHOD OF MANUFACTURE, the entire contents of which are herein incorporated by reference. The present invention is also related in some aspects to commonly-owned and co-pending application Ser. No. 12/750,823, filed Mar. 31, 2010, and entitled MULTICHIP LIGHT EMITTING DIODE (LED) AND METHOD OF MANUFACTURE, the entire contents of which are herein incorporated by reference. The present invention is also related in some aspects to commonly-owned and co-pending application Ser. No. 12/851,575, filed Aug. 6, 2010, and entitled MODULAR DISPLAY, the entire contents of which are herein incorporated by reference. The present invention is also related in some aspects to commonly-owned and co-pending application Ser. No. 12/750,816, entitled LIGHT EMITTING DIODE HAVING A WAVELENGTH SHIFT LAYER AND METHOD OF MANUFACTURE, filed on Mar. 31, 2010, the entire contents of which are herein incorporated by reference. The present invention is also related in some aspects to commonly-owned and co-pending application Ser. No. 12/851,573, filed Aug. 6, 2010, and entitled VARIABLE HEIGHT LIGHT EMITTING DIODE AND METHOD OF MANUFACTURE, the entire contents of which are herein incorporated by reference.

TECHNICAL FIELD

The present invention generally relates to light diffusion into visible edge lines in a multi-dimensional modular display. Specifically, the present invention relates to a modular display that is capable of displaying a single, continuous image without visible edge lines from a plurality of aligned displays with multi-dimensional image quality.

BACKGROUND OF THE INVENTION

As televisions and other video displays continue to evolve, the desire for enhanced functionality continues. For example, many computer users now use multiple displays so that different sets of data can be viewed in series or in parallel. These multiple computer displays can typically be organized with a single screen's image being repeated across multiple displays or as an extended desktop wherein the multiple displays are virtually connected wherein the mouse icon will move from one display to another with relative screen locations being determined during setup of the multiple display management software.

In addition, many restaurants, open public areas, and other establishments attempt to increase the size of a display by aligning several displays in an attempt to create a larger image. Examples of such technology have been developed by CineMassive® and 9 X Media®, Inc. Unfortunately, no previous approach has been successful in aligning multiple displays without either different images being displayed and/or edge line from the displays appearing in the image in a grid-like or other fashion. Such edge lines cause the image to be segmented or non-continuous in nature, which decreases its image quality and its ease of viewing to the user. In view of the foregoing, there exists a need for a solution that solves at least one of the deficiencies in the prior art.

Current LED device pixels have a blocking dam around the edge line of each pixel to protect against color diffusion between pixels. Light diffusion between pixels results in a resolution performance decrease. A modular display with blocking dams around each pixel can bring a visible edge line into the produced image.

As LEDs continue to grow in popularity as an efficient technological device, the need for continued advancement grows as well. Along these lines, obtaining white light output from LED is not only needed, but also difficult to achieve. Many approaches in the past have attempted to find new ways to obtain white light. However, many of these approaches perform such processing at the chip level instead of at the wafer level. Such an approach can result in chip waste. Moreover, none of the existing approaches vary phosphor ratios based on an underlying device measurement (such as a wavelength of a light output). For example, U.S. Pat. No. 6,650,044 forms a pedestal on top of a pad. The pedestal is a stud bump that is used for connectivity. This approach is not ideal as it is inefficient, does not provide chip level coating, is much harder to polish, and is easily contaminated. Moreover, in previous approaches such as U.S. Pat. Nos. 7,446,733 and 7,190,328, pads were manufactured so that all LEDs thereon had the same height. In view of the foregoing, there exists a need for a LED and associated method of manufacture that addresses the deficiencies of the related art.

SUMMARY OF THE INVENTION

Embodiments of the present invention provide a color diffusion edge to negate visible edge lines in a modular display, and thus the present invention provides said modular display that is capable of displaying a single, continuous image without visible edge lines between each of a plurality of display modules. One module, in said modular display, includes a plurality of light emitting pixels that contain red, green, blue, and white light sources. One example is a LED device. Replacement of the blocking dam, with said color diffusion edge, around said plurality of light emitting pixels edge in said modular display can provide a single, continuous image to be displayed thereon without being obstructed by edge lines. In previous art, the blocking dam edge lines appear in, and reduce the quality of, the image (e.g., they overlay and/or segment the image in a grid-like fashion). Conversely, the color diffusion edge of the present invention renders the edge lines invisible wherever the image is displayed. Said plurality of display modules can be light emitting diode (LED)-based displays, organic LED (OLED)-based displays, UV LED-based displays, RGB LED-based displays, Phosphor-based LED displays, Quantum dot LED-based displays, or a combination thereof.

Said plurality of light emitting pixels include a variable height buffer layer beneath each light emitting pixel subcomponent. Said variable height layer buffer aids in both the display edge image quality improvement and in the generation of 2-dimensional or 3-dimensional images being displayed by said modular display. Thus, the product of said modular display is a multidimensional image output. Additional control circuitry is further configured to control said plurality of display modules individually or collectively.

A first aspect of the present invention provides a modular display, comprising: a plurality of display modules combined to create said modular display, a plurality of light emitting pixels within each of said plurality of display modules, a variable height buffer layer within said plurality of light emitting pixels, and a multidimensional image output, said multidimensional image output being from said modular display.

A second aspect of the present invention provides a modular display, comprising: a plurality of display modules combined to create said modular display, a plurality of light emitting pixels within each of said plurality of display modules, an intra-pixel barrier that includes said color diffusion edge along said plurality of light emitting pixel's interfaces, an intra-display module barrier that includes said color diffusion edge along said plurality of light emitting pixel's interfaces of the perimeter of said plurality of display modules, a variable height buffer layer within said plurality of light emitting pixels, and a multidimensional image output, said multidimensional image output being from said modular display.

A third aspect of the present invention provides a modular display, comprising: a plurality of display modules combined to create said modular display, a plurality of light emitting pixels within each of said plurality of display modules, a variable height buffer layer within said plurality of light emitting pixels, a variable height buffer layer within subcomponents of said plurality of light emitting pixels, and a multidimensional image output, said multidimensional image output being from said modular display.

BRIEF DESCRIPTION OF THE DRAWINGS

These and other features of this invention will be more readily understood from the following detailed description of the various aspects of the invention taken in conjunction with the accompanying drawings in which:

FIG. 1 depicts a modular display being created by aligning multiple display modules in accordance with one embodiment of the present invention.

FIG. 7 depicts a plurality of interconnected LED chips with a variable-height, underlying buffer layer/mask according to an embodiment of the present invention. The variable height of the buffer layer adds an additional methodology for controlling the light directionality related to the display edge and in generating a 3-dimensional image with the modular display.

Figure 2B:
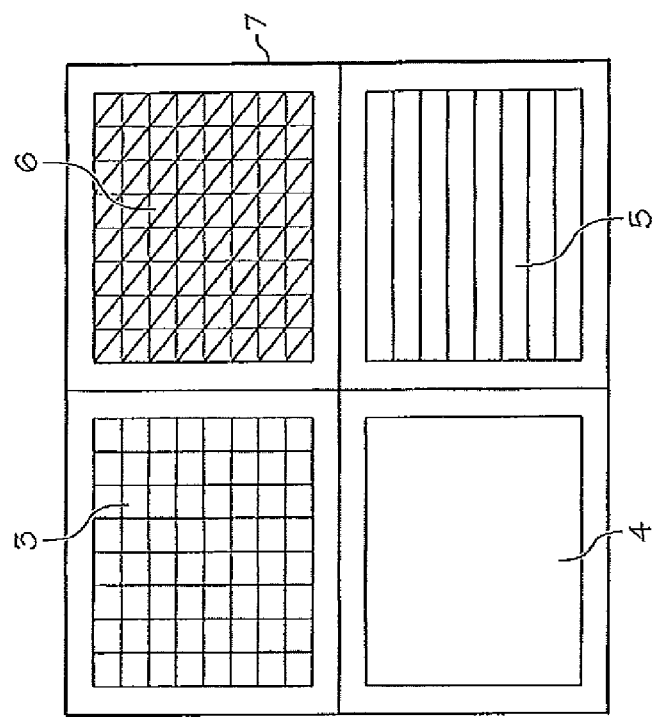
FIG. 2A-2C depict alternative views of one pixel of the module that contains red, green, blue, and white light sources. The pixel has a blocking dam around the edge of the pixel to protect against light diffusion between pixels. The buffer layer, beneath the individual pixel components, is varied in height.

These drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provides light diffusion into visible edge lines in modular display, and thus the present invention provides a modular display that is capable of displaying a single, continuous image without visible edge lines among each modular display. In one embodiment, one module in the modular display includes a plurality of pixels that contain red, green, blue, and white light sources. Each pixel has a blocking dam around the edge line of the pixel to protect light diffusion between pixels. Light diffusion between pixels results in the decrease of resolution. Modular display with a blocking dam around each pixel can bring visible edge lines into relief. Conversely, replacement of the blocking dam with a color diffusion edge around perimeter of the modular display can provide a single, continuous image to be displayed thereon without being obstructed by edge lines.

FIG. 1 shows modular display being created by combining individual display modules (1) in accordance with an embodiment of the present invention. Under the present invention, a plurality of modules are combined (e.g., positioned proximate to one another to yield a single unit), that is, a modular display. In general, displays can comprise any type of display now known or later developed. For example, displays can comprise TV panels. Along these lines, modular displays can comprise light emitting diode (LED)-based displays, organic LED (OLED)-based displays, UV LED-based displays, RGB LED-based displays, Phosphor-based LED displays, Quantum dot LED-based displays, or a combination thereof. This embodiment includes an 8×8 arrangement with a total of 64 individual displays. This embodiment is not limiting to the number of displays, aspect ratios, or any requirement that the number of individual display modules in one direction be the same in the other direction (i.e. 2×4, etc.). The use of individual display modules (1) can lead to edges of the individual display module (1) units to be visible in the resultant image as edge lines (2).

Figure 2C:
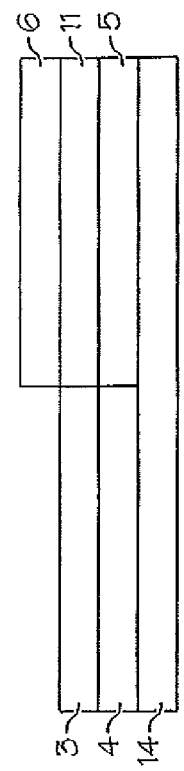
Figure 2A:
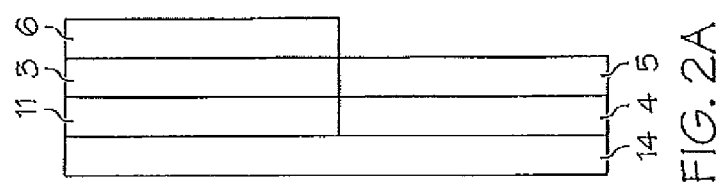

FIG. 2 shows one pixel of the module that contains red (3), green (4), blue (5), and white (6) subcomponent light sources. Each pixel has a blocking dam (7) around the edge line of the pixel to protect against light diffusion between pixels. Red (3), green (4), blue (5), and white (6) subcomponent light emitting pixel components can comprise light emitting diode (LED)-based displays, organic LED (OLED)-based displays, UV LED-based displays, RGB LED-based displays, Phosphor-based LED displays, Quantum dot LED-based displays, or a combination thereof. In this embodiment, the buffer layer (11) height is varied beneath the four light emitting pixel subcomponents. In the shown arrangement the blue (5) and red (3) subcomponents have a 1× buffer layer (11) height, the white (6) subcomponent has a 2× buffer layer (11) height and the green (4) subcomponent does not have a buffer layer (11) between the green subcomponent and the substrate (14).

Figure 3:
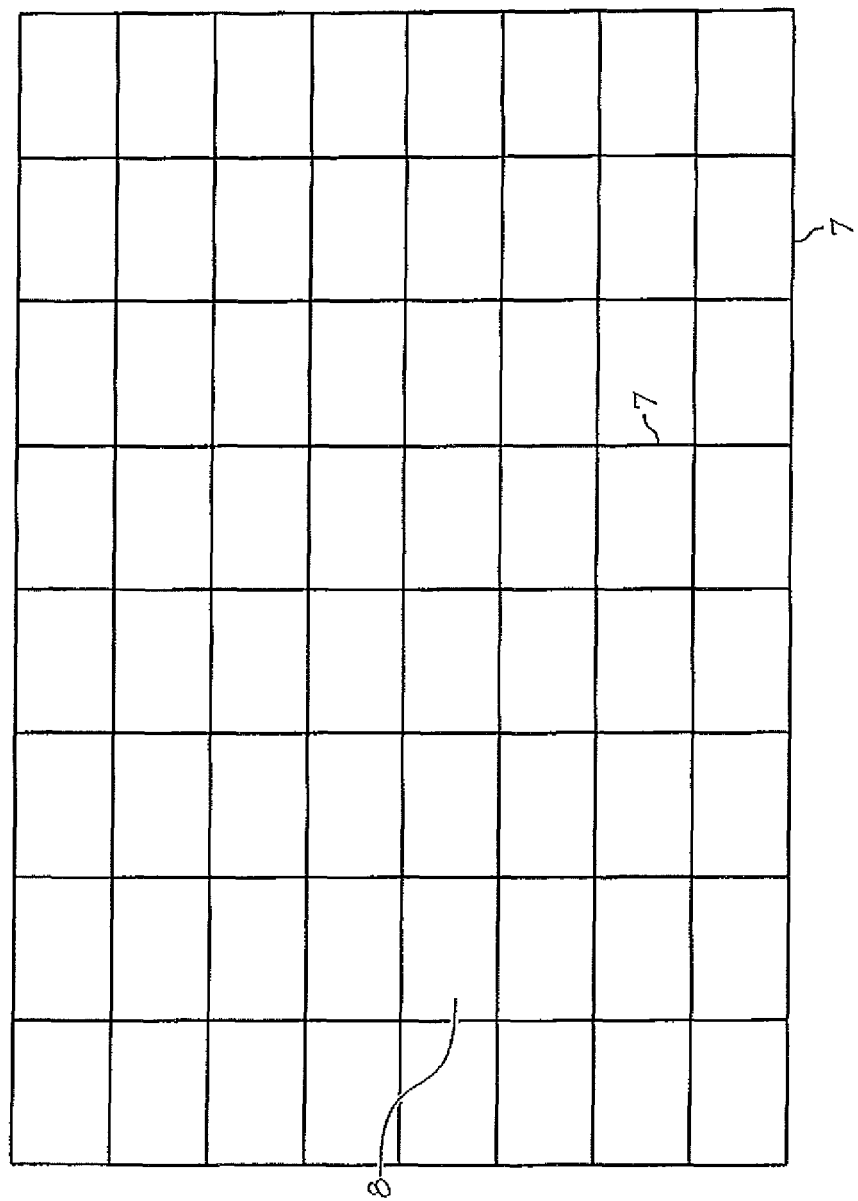
FIG. 3 depicts an individual unit of the modular display with a blocking dam between each pixel which brings a visible edge line effect in the displayed image.

FIG. 3 shows an individual display module with an 8×8 light emitting pixel (8) arrangement. The blocking dam (7) around the edge line of each light emitting pixel (8) can protect against light diffusion between light emitting pixels (8). Light diffusion between pixels results in the decrease of resolution. The blocking dam (7) can be fabricated by paraffin dispensing or silicon dispensing methods. Visible edge lines are created between the light emitting pixels (8) by protecting against light diffusion with the blocking dam (7).

Figure 4:
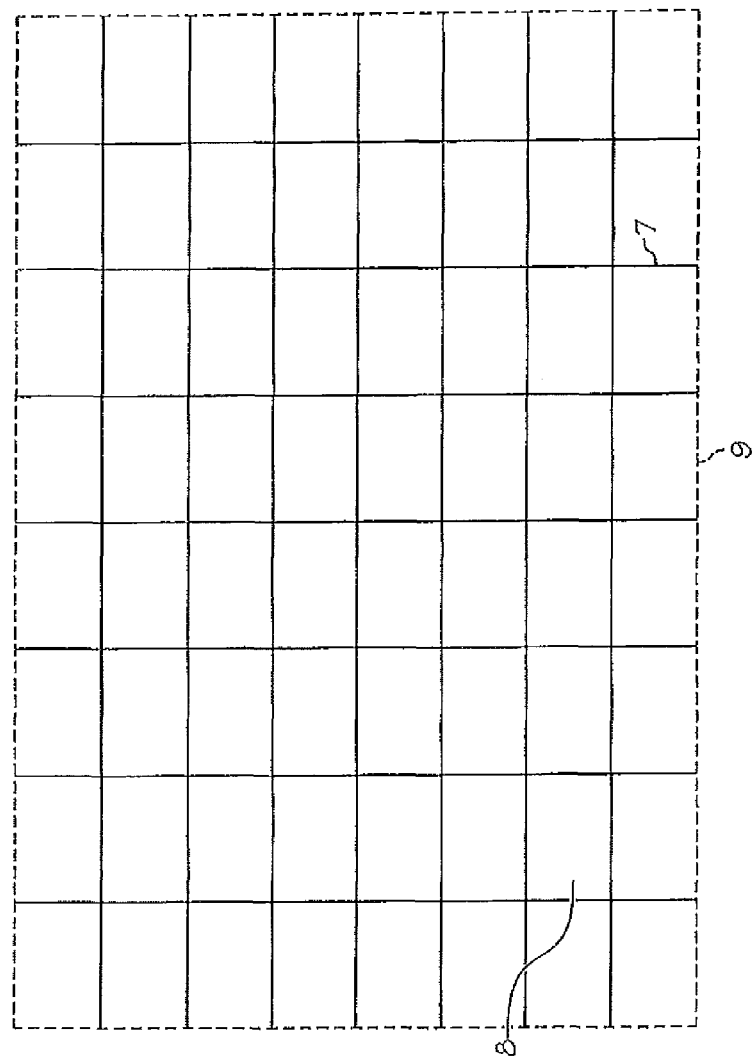
FIG. 4 depicts the replacement of the blocking dam of the edge line between the individual displays within the modular display resulting in a single, continuous image being displayed thereon without being obstructed by edge lines between the plurality of display modules.

FIG. 4 shows an individual display module with an 8×8 light emitting pixel (8) arrangement. The replacement of the blocking dam (7) with the color diffusion edge (9) around the perimeter of the individual display module provides a single, continuous image to be displayed thereon without being obstructed by edge lines. Visible edge lines can be effectively removed by replacement of the blocking dam (7) with the color diffusion edge (9).

Figure 5:
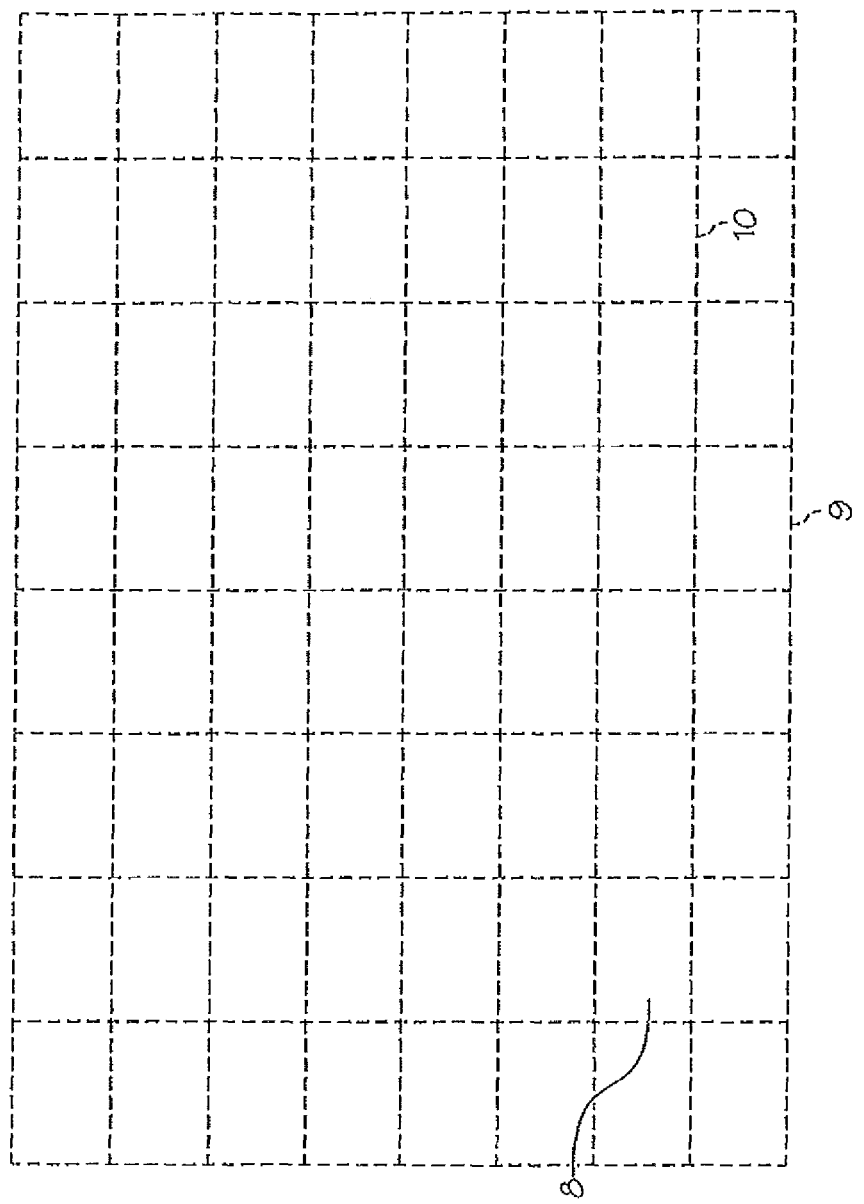
FIG. 5 depicts the edge line diffusion of the present invention with regards to both the intra-module pixel borders and the inter-module display borders.

FIG. 5 shows the color diffusion edge (9) around the light emitting pixel (8) and the color diffusion edge (10) along the light emitting pixel (8) interfaces with other display modules (1) of the present invention which render the edges invisible in the image that is displayed. Under the present invention, light diffusion functionality is achieved with the color diffusion edge (9) along the intra-display module interface and with the color diffusion edge (10) along the light emitting pixel interfaces with other display modules (1). The improved light diffusion with the color diffusion edge (9 and 10) provides continuous modular display images.

Figure 6:
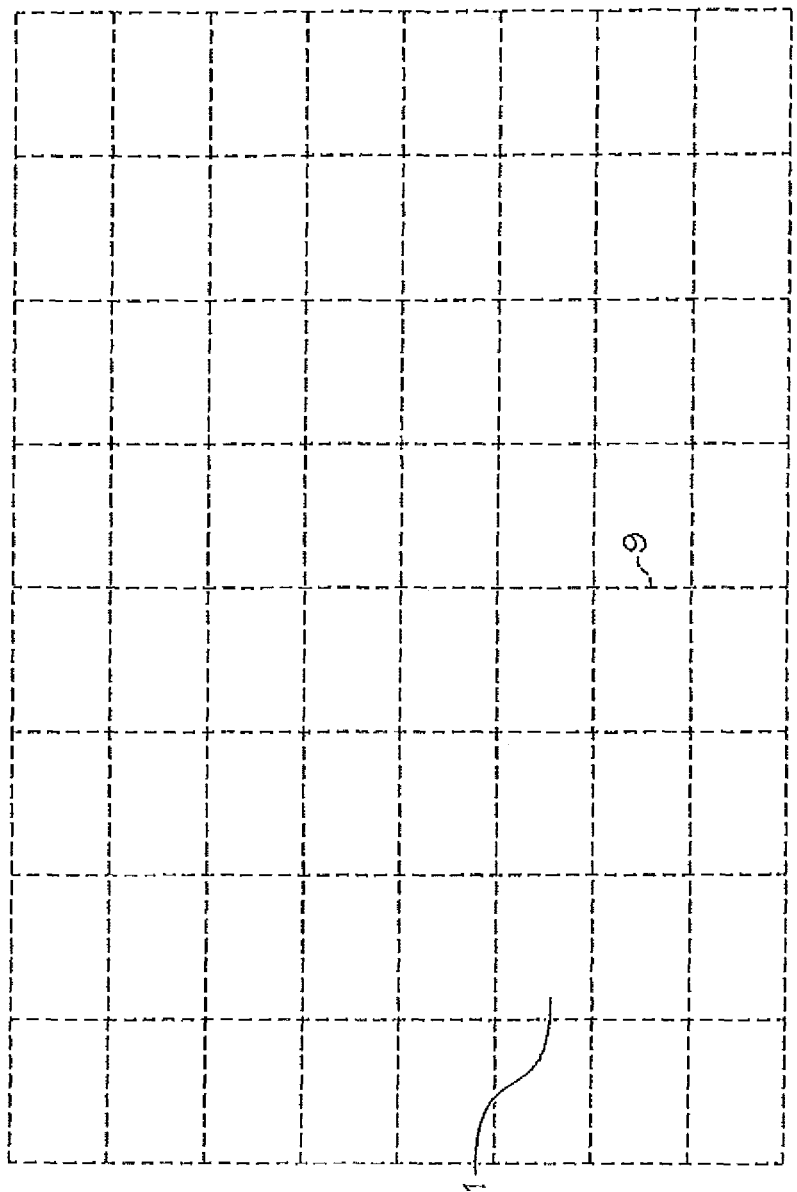
FIG. 6 depicts the edge line diffusion of the present invention with a modular display being created by aligning multiple display modules in accordance with one embodiment of the present invention. The color diffusion intra-display module interface creates a single, continuous image to be displayed by the plurality of display modules acting as a larger single display module.

FIG. 6 shows the color diffusion edge between the plurality of display modules (1) of the present invention which render the edges invisible wherever the image is displayed. Under the present invention, light diffusion is provided to modify the blocking dam technology between pixels and around display module edge lines. Light diffusion around pixel and display module edge lines provides a continuous modular display output image, and is shown as the color diffusion edge (9) along the intra-display module interface that is the border between the plurality of display modules (1).

In FIG. 7, an additional application of the present invention is schematically shown. Referring to FIG. 7, an illustrative array/plurality of LED chips is shown. As depicted, an array of light emitting pixels (8) are electrically interconnected via metal lines (10). In addition, ground contacts (15) are used to connect the array to a ground. It should be understood in advance when the terms such as "light emitting pixel", "blue light emitting pixel device", "green light emitting pixel device" are used herein, what is meant is that the light emitting device produces light having those colors (e.g., red light, blue light, green light, white light, etc.). Thus, "red light emitting pixel device" is an abbreviated way of saying "red light producing LED chip", "red light producing OLED chip", or "red light producing pixel". As further shown, light emitting pixel (8) components may be positioned over a variable height buffer layer (11). As shown in FIG. 2, this variable height buffer layer (11) need not have a constant thickness within the array of light emitting pixels (8). Rather, there exists an area where no variable height buffer layer was applied and areas where two different thicknesses of the variable height buffer layer were applied within the light emitting pixels (8). Such application of the variable height buffer layer (11) will result in light emitting pixel (8) devices having varied thicknesses of the variable height buffer layer (11). Additionally, such application of the variable height buffer layer (11) will result in individual light emitting pixel (8) device components having varied heights. The light (13) is emitted from the light emitting pixels (8) and has a focal plane (12). Along the edge of the light emitting pixel (8) the color diffusion edge (9) allows color diffusion without the resultant edge being included in the multidimensional image output of the display module.

As depicted, red light emitting device components (3), green light emitting device components (4), blue light emitting device components (5), and white light emitting device components (6) are electrically interconnected by a metal line (10) in a 2×2 matrix format. Under the present invention, light emitting pixel (8) subcomponents will have varying heights due to the underlying variable height buffer layer (11). With differing thicknesses of the variable height buffer layer (11), the light emitting pixel (8) components can create an edge line free image from the modular display. Referring to FIGS. 1 through 4, light diffusion is provided by a blocking dam (7) around the light emitting pixels (8) edge lines. The color diffusion around edge lines, shown in FIG. 6, provides a continuous modular display image output. In this concept, with an added variable height buffer layer (11), the light diffusion capability can be increased. Light diffusion around edge lines within the concept of both a blocking dam and barrier color diffusion layer provides continuous modular displays with 2-dimensional and 3-dimensional image quality.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A modular display, comprising:
   a plurality of display modules to create said modular display;
   a plurality of light emitting pixels within each of the plurality of display modules;
   a buffer layer positioned under said plurality of light emitting pixels, the buffer layer configured to cause a height of at least one light emitting pixel of the plurality of light emitting pixels to vary from a height of another light emitting pixel of the plurality of light emitting pixels in such a way that light directionality of light emitted from the plurality of light emitting pixels renders substantially invisible at least one of: interfaces between light-emitting pixels of the plurality of light-emitting pixels, and interfaces between display modules of the plurality of display modules; and a multidimensional image output, said multidimensional image output being from said modular display.

2. The modular display of claim 1, further comprising a blocking dam that is fabricated by a paraffin dispensing or silicon dispensing step, located on an outer edge of said plurality of light emitting pixels or located on an outer edge of said plurality of display modules.

3. The modular display of claim 1, wherein said plurality of light emitting pixels, of said plurality of display modules, contain red, green, blue, and white light sources.

4. The modular display of claim 1, wherein said multidimensional image output is 2-dimensional.

5. The modular display of claim 1, wherein said multidimensional image output is 3-dimensional.

6. The modular display of claim 1, wherein said outer edge of said plurality of light emitting pixels without a blocking dam can provide a single, continuous image to be displayed without being obstructed with edge lines.

7. The modular display of claim 1, wherein said outer edge of said plurality of display modules without a blocking dam can provide a single, continuous image to be displayed without being obstructed with edge lines.

8. The modular display of claim 1, wherein said modular display can include a plurality of display modules that are based upon light emitting diode (LED), organic LED (OLED), UV LED, RGB LED, Phosphor-based LED, Quantum dot LED, or a combination thereof.

9. The modular display of claim 1, wherein said variable height buffer layer can be fabricated by semiconductor processing.

10. The modular display of claim 1, wherein said variable height buffer layer is varied between said plurality of light emitting pixels components such that the red, green, blue, or white light source components are at varied heights.

11. A modular display, comprising:
a plurality of display modules combined to create said modular display;
a plurality of light emitting pixels within each of the plurality of display modules;
an intra-pixel barrier that includes a color diffusion edge along the plurality of light emitting pixel's interfaces;
an intra-display module barrier that includes said color diffusion edge along the plurality of light emitting pixel's interfaces of the perimeter of said plurality of display modules;
a buffer layer positioned under said plurality of light emitting pixels, the buffer layer configured to cause a height of at least one light emitting pixel of the plurality of light emitting pixels to vary from a height of another light emitting pixel of the plurality of light emitting pixels in such a way that light directionality of light emitted from the plurality of light emitting pixels renders substantially invisible at least one of:
interfaces between light-emitting pixels of the plurality of light-emitting pixels, and interfaces between display modules of the plurality of display modules; and
a multidimensional image output, said multidimensional image output being from said modular display.

12. The modular display of claim 11, further comprising said color diffusion edge that is fabricated by a paraffin dispensing or silicon dispensing step, located on an outer edge of said plurality of light emitting pixels or located on an outer edge of said plurality of display modules.

13. The modular display of claim 11, wherein said plurality of light emitting pixels, of said plurality of display modules, contain red, green, blue, and white light sources.

14. The modular display of claim 11, wherein said multidimensional image output is 2-dimensional.

15. The modular display of claim 11, wherein said multidimensional image output is 3-dimensional.

16. The modular display of claim 11, wherein said outer edge of said plurality of light emitting pixels without a blocking dam can provide a single, continuous image to be displayed without being obstructed with edge lines.

17. The modular display of claim 11, wherein said outer edge of said plurality of display modules without a blocking dam can provide a single, continuous image to be displayed without being obstructed with edge lines.

18. The modular display of claim 11, wherein said modular display can include a plurality of display modules that are based upon light emitting diode (LED), organic LED (OLED), UV LED, RGB LED, Phosphor-based LED, Quantum dot LED, or a combination thereof.

19. The modular display of claim 11, wherein said t buffer layer can be fabricated by semiconductor processing.

20. A modular display, comprising:
a plurality of display modules combined to create said modular display;
a plurality of light emitting pixels within each of the plurality of display modules;
a buffer layer positioned under said plurality of light emitting pixels, the buffer layer configured to cause a height of at least one light emitting pixel of the plurality of light emitting pixels to vary from a height of another light emitting pixel of the plurality of light emitting pixels in such a way that light directionality of light emitted from the plurality of light emitting pixels renders substantially invisible at least one of: interfaces between light-emitting pixels of the plurality of light-emitting pixels, and interfaces between display modules of the plurality of display modules; and
a multidimensional image output, said multidimensional image output being from said modular display.

* * * * *